United States Patent
Piitulainen et al.

(10) Patent No.: US 10,965,224 B2
(45) Date of Patent: Mar. 30, 2021

(54) METHOD FOR LEVITATION CONTROL OF A LINEAR MOTOR, METHOD FOR MEASURING A POSITION OF A LINEAR MOTOR, INDUCTIVE SENSING DEVICE, AND ELEVATOR SYSTEM

(71) Applicant: KONE Corporation, Helsinki (FI)

(72) Inventors: Henry Piitulainen, Helsinki (FI); Seppo Suur-Askola, Helsinki (FI); Tero Purosto, Helsinki (FI)

(73) Assignee: KONE CORPORATION, Helsinki (FI)

( * ) Notice: Subject to any disclaimer, the term of this patent is extended or adjusted under 35 U.S.C. 154(b) by 648 days.

(21) Appl. No.: 15/868,828

(22) Filed: Jan. 11, 2018

(65) Prior Publication Data

US 2018/0248498 A1 Aug. 30, 2018

(30) Foreign Application Priority Data

Feb. 27, 2017 (EP) .................... 17158239

(51) Int. Cl.
*H02N 15/00* (2006.01)
*H02P 6/16* (2016.01)
(Continued)

(52) U.S. Cl.
CPC ......... *H02N 15/00* (2013.01); *B66B 11/0407* (2013.01); *H02K 41/033* (2013.01);
(Continued)

(58) Field of Classification Search
CPC ......... H02N 15/00; H02P 6/17; H02P 25/064; H02P 6/16; B66B 11/0407; H02K 41/033
(Continued)

(56) References Cited

U.S. PATENT DOCUMENTS 10,574,166 B2 * 2/2020 Raassina ............. B66B 11/0407
10,689,227 B2 * 6/2020 Korhonen ............... B66B 9/003
(Continued)

FOREIGN PATENT DOCUMENTS

DE 44 27 990 A1 2/1996
WO WO 2008/075269 A2 6/2008
(Continued)

OTHER PUBLICATIONS

European Search Report issued in Application No. 17158239.8 dated Aug. 29, 2017.
(Continued)

*Primary Examiner* — David S Warren
(74) *Attorney, Agent, or Firm* — Birch, Stewart, Kolasch & Birch, LLP (57) ABSTRACT

A method for levitation control of a linear motor includes supplying an alternating current or alternating voltage to at least one oscillating circuit including at least one sensing coil being or assumed to be arranged in a fixed spatial correlation to a mover part of the linear motor such that an opening plane of the sensing coil faces a sensor counter-surface of a stator part of the linear motor with a gap therebetween; receiving a response signal from the oscillating circuit; determining a gap length of the gap based on the response signal; and controlling the gap length by driving a magnetic levitation unit of the linear motor based on the determined gap length. An inductive sensing device and an elevator system, and a method for determining a position of the linear motor are also disclosed.

20 Claims, 8 Drawing Sheets

(51) Int. Cl.
  *H02P 6/17* (2016.01)
  *H02P 25/064* (2016.01)
  *B66B 11/04* (2006.01)
  *H02K 41/03* (2006.01)

(52) U.S. Cl.
  CPC ............... *H02P 6/16* (2013.01); *H02P 6/17* (2016.02); *H02P 25/064* (2016.02)

(58) Field of Classification Search
  USPC .......................................................... 187/289
  See application file for complete search history.

(56) References Cited

U.S. PATENT DOCUMENTS

| | | |
|---|---|---|
| 2010/0188104 A1 | 7/2010 | Speckmann et al. |
| 2015/0344266 A1 | 12/2015 | Inoue et al. |
| 2017/0313549 A1* | 11/2017 | Vakkamaki ............... B66B 1/32 |
| 2017/0313550 A1* | 11/2017 | Vakkamaki ........... B66B 5/0025 |
| 2018/0248498 A1* | 8/2018 | Piitulainen ............ H02P 25/064 |
| 2018/0262146 A1* | 9/2018 | Raassina ............. H02K 41/033 |
| 2019/0300329 A1* | 10/2019 | Korhonen ................. B66B 1/30 |
| 2020/0195182 A1* | 6/2020 | Lahteenmaki .......... B66B 1/308 |
| 2020/0195183 A1* | 6/2020 | Lahteenmaki ........ H02P 25/064 |

FOREIGN PATENT DOCUMENTS

| | | |
|---|---|---|
| WO | WO 2016/126805 A1 | 8/2016 |
| WO | WO 2016/207136 A1 | 12/2016 |

OTHER PUBLICATIONS

Texas Instruments, "LDC1101 1.8-V High-Resolution, High-Speed Inductance-to-Digital Converter", LDC1101, Oct. 31, 2016, pp. 1-58.

* cited by examiner

METHOD FOR LEVITATION CONTROL OF A LINEAR MOTOR, METHOD FOR MEASURING A POSITION OF A LINEAR MOTOR, INDUCTIVE SENSING DEVICE, AND ELEVATOR SYSTEM

The present invention relates to a method for levitation control of a linear motor, a method for measuring a position of a linear motor, an inductive sensing device, and an elevator system.

BACKGROUND OF THE INVENTION

A linear motor is known to be used to move cars of conveyors, trains, elevators, or the like. A linear motor comprises a stator part and a mover part. A stator part may comprise a toothed stator rail, and the mover part may comprise a number of motor units each having an arrangement of poles, permanent magnets, and electric coils controlled to generate a magnetic flux cooperating with the teeth of the stator rail, for generating a desired linear movement of the mover part with respect to the stator part. An air gap of a certain length is needed between the mover part and the stator rail for the linear motor to work properly. It is known to have pairs of motor units on opposite sides of the stator part, forming so-called levitation pairs (levitation units) keeping an air gap of equal length on both sides of the stator part. For example, the mover part may comprise four linear motor units which form two opposite levitation pairs around the stator rail, and during a movement both levitation pairs are controlled so that the stator rail stays in the middle of the mover without making contact.

The permanent magnets of the linear motor units generate strong forces towards the stator rail. Here, when the stator rail is exactly in the middle of the mover, the system is labile, meaning that the sum force is zero and the stator rail stays in the middle without additional force. However, even a slight bias to the equilibrium of forces causes that the sum force deviates from zero, which may drive the system into imbalance which may exponentially increase as one permanent magnet generating attractive force approaches the rail and the other generating counterforce moves away. Without control or guidance, the gap length may reduce to zero in a fraction of a second. When the mover part is moving in such situation, the moved parts may grip to the rail which can cause severe damage to passengers, car, rails and/or motor units.

It has been known to use sliding guides or roller guides or magnetic guides for keeping the mover part in track. However, such guides call for considerable efforts in materials and tolerance control because the guides need to be exactly aligned with the stator rails.

A gap length control must detect and react to the imbalance as fast as possible. It has been attempted to control of levitation with optical laser. However, such a laser is very costly which is not desirable for the end product.

Additionally, drives controlling the linear motor units require position information about the position of the linear motors in relation to the stator rail to be able to determine the phase angle and to generate a smooth movement. To be able to control a linear motor system which does not have a fixed air gap between a mover (rotor) and a stator rail, very precise and fast information about the length of an air gap and the position of the mover in relation to the stator teeth (phase angle) is required.

It has also been known that the position information may be acquired with a linear magnetic encoder and/or an end/head laser. However, the laser does not easily suit for the multicar use as it requires stable reference point which could be blocked by other cars in the shaft. Also, the installation of a magnetic tape for the linear encoder may be difficult and time-consuming and therefore not preferable.

SUMMARY OF THE INVENTION

It is therefore an object of the present invention to provide a method, sensing device, and elevator system enabling reliable and highly responsive levitation control of a linear motor with affordable means, and without the need of additional guidance. The above and other objects are solved by the features of the independent claims, at least in part. Advantageous embodiments and further developments solving further objects or enhancing the solution of previous claims are subject-matter of dependent claims.

An aspect of the present invention relates to a method for levitation control of a linear motor. The method comprises the steps:
  supplying an alternating current or alternating voltage to at least one oscillating circuit comprising at least one sensing coil being or assumed to be arranged in a fixed spatial correlation to a mover part of the linear motor such that an opening plane of the sensing coil faces a sensor counter-surface of a stator part of the linear motor with a gap therebetween;
  receiving a response signal from the oscillating circuit;
  determining a gap length of the gap based on the response signal; and
  controlling the gap length by driving a magnetic levitation unit of the linear motor based on the determined gap length.

A levitation control of a linear motor in the sense of the present invention is control of a distance of a mover part from a stator part of the linear motor, and in particular, a control of keeping the gap length within a predetermined range. The linear motor may be a flux switching permanent magnet linear motor having all electric and magnetic elements in respective motor units of the mover part while the stator part has a toothed surface of a magnetisable material to co-act with the motor units, but has no permanent magnets or active elements of the linear motor. It will be noted that the mover part itself may act as the levitation unit in cooperation with the stator part. The levitation unit may comprise a plurality of motor units, being for example arranged in pairs with two motor units producing opposed levitation forces. The sensing coil may be an air core coil, may be formed as a planar coil, and may be placed or printed on a printed circuit board (PCB) which may carry other elements of the oscillation circuit. Other coil forms however are possible; however, an air core coil may allow for quick pole reversal, and planar coils may also allow for a well-defined positioning especially when directly printed on the PCB. The oscillation circuit may include at least the sensing coil, a capacitor, and an oscillator which supplies the alternating current or alternating voltage in a controlled manner. The oscillator may be a crystal oscillator and may be embodied in a converter (inductance-to-digital converter). A plurality of oscillation circuits may be used to receive a plurality of individual response signals; the plurality of response signals may enhance accuracy and reliability of the gap length measurements. The sensor counter-surface should be a surface of an object having electric and/or magnetic properties being influenced by a magnetic field produced by the sensing coil. As such influence has some back-influence on the magnetic field and, in turn, on the properties of the oscillation circuit, such back-influence may be detected as the response signal. The method relies on oscillation circuits which may be formed by affordable elements, so the total cost of the system may be kept low. As converters with high sampling rates are available, the measurement may detect changes very quickly so that the levitation control may be highly responsive and reliable. The method is in particular applicable to linear motors of an elevator system.

In embodiments, the supply of alternating current or alternating voltage may be controlled to maintain an oscillation amplitude of the oscillation circuit at a constant level while monitoring the energy consumption. Then, the gap length may be determined based on a variation of the monitored energy consumption. Here, the response signal may correspond to the monitored energy consumption. This method relies on an energy loss owing to Eddy currents induced in an electrically conductive object placed in the magnetic field of the sensor coil. Therefore, the material having or underlying the sensor counter-surface needs to be electrically conductive. An object providing the sensor counter-surface may therefore be formed of copper or aluminium or alloys therewith. Even if the material having or underlying the sensor counter-surface needs not to have specific magnetic properties for this method embodiment to work, it may also be magnetisable without affecting the sensor function so that an object providing the sensor counter-surface may also be formed of iron, steel or the like.

In another embodiment, the alternating current or alternating voltage may be generated with a stable reference frequency while monitoring the oscillation frequency of the oscillation circuit. Then, the gap length may be determined based on a deviation of the monitored oscillation frequency from the reference frequency. Here, the response signal may correspond to the monitored oscillation frequency. This method is based on a phenomenon that a material having magnetic permeability provides magnetic resistance to the magnetic paths of the magnetic field generated by the sensor coil so that the sum inductance is changed which results in a frequency change of the oscillation circuit. Therefore, the object providing the sensor counter-surface needs to have preferably high magnetically permeable such as, e.g., iron, steel, or the like, in this embodiment.

In another embodiment, the alternating voltage may be supplied with a constant amplitude while monitoring an amplitude of a responsive alternating current generated in the oscillation circuit in response to the supplied alternating voltage. Then, a frequency of the alternating voltage may be changed gradually such that the amplitude of the responsive alternating current changes towards a preset reference current value until the amplitude of the responsive alternating current corresponds to the reference current value. Then, a frequency of the alternating voltage that causes this current may be detected and compared to a preset reference frequency value. Then, the gap length may be determined based on a difference of the detected frequency from the reference frequency value. Here, the response signal may correspond to the frequency of the alternating voltage.

In embodiments, the method may be executed using an inductance-to-digital converter having a conversion rate of 5 ksps, i.e. kilo samples per second, or more, preferably 1000 ksps or more, in particular 100,000 ksps or more. The higher the conversion rate, the better the measuring reliability and responsivity that can be achieved. Also, with higher conversion rate, a lower measurement accuracy may be needed.

In principle, the sensing counter-surface may provide uniform electric and/or magnetic properties which may be provided by a flat or planar surface of an object facing the sensor coil. Such uniform electric and/or magnetic properties may allow for achieving a good accuracy and continuity of gap length measurement. Alternatively, the sensor counter-surface may provide alternating electric and/or magnetic properties. Such alternating electric and/or magnetic properties may allow for not only gap length measurement but also for detection of a longitudinal position of the mover part with respect to the stator part because the alternating electric and/or magnetic properties will produce a distinct change of the response signal. Therefore, in embodiments of the method, the response signal is used for determining a position and/or velocity and/or acceleration of the mover part with respect to the stator part in a moving direction of the mover part, based on the stator part where the sensor counter-surface is formed having alternating electric conductivity and/or magnetic permeability properties in a moving direction of the mover part. By determining a position and/or velocity and/or acceleration it is meant that at least one value of the respective position and/or velocity and/or acceleration is determined. Such alternating electric and/or magnetic properties may e.g. be provided by a toothed surface where the teeth provide higher electric conductivity and/or magnetic permeability, and spaces or slots between the teeth provide lower electric conductivity and/or magnetic permeability. As the toothed surface, the surface of a stator rod may be used.

In embodiments, an amplitude or change of amplitude over time of the response signal may be analysed for determining the position of the mover part. In other words, a waveform of the response signal is analysed. The response signal may be digitalized or normalized to achieve a distinct change in signal level indicative for the respective sensor coil sensing a change of electric and/or magnetic properties at the sensor counter-surface. Waveforms originating from a change of position in moving direction typically having a higher amplitude may be separated from waveforms originating from a change of gap length typically having a lower amplitude, both waveforms being superposed in the original response signal.

In embodiments, response signals of a plurality of oscillation circuits may be received simultaneously for determining the position of the mover part. A plurality of sensor coils may be arranged in a staggered, i.e., consecutively and/or overlappingly arranged manner so that continuous position and gap length measurement is ensured.

In embodiments, a common change of the response signals of the plurality of oscillation circuits may be correlated with a change of the gap length, and a subsequent change of the response signals of the plurality of oscillation circuits may be correlated with a change of position of the mover part.

In embodiments, an interval of wave fronts of the response signals of the plurality of oscillation circuits may be used for determining a velocity of the mover part. An acceleration may be additionally obtained by further analysis of the response signals.

Another aspect of the invention relates to an inductive sensing device for use in the method described above for levitation control of a linear motor. The inductive sensing device comprises at least one sensing coil of an oscillating circuit. The sensing coil is arranged or arrangeable in a fixed spatial correlation to a mover part of the linear motor such that an opening plane of the sensing coil faces a sensor counter-surface of a stator part of the linear motor with a gap therebetween. The sensing device is therefore formed to fit the method described above and exhibits at least the same qualities and advantages.

In embodiments, the inductive sensing device may further comprise at least one sensing unit comprising a plurality of oscillating circuits each comprising at least one sensing coil, the sensing coils may be arranged such that at least two of the sensing coils succeed each other in the moving direction of the mover part, and/or at least two of the sensing coils overlap each other in the moving direction. Thereby, a staggered configuration of the sensor coils is achieved as described above.

In embodiments, two of the sensing coils succeeding each other in the moving direction may be displaced from each other crossways of the moving direction. By such displacement, a distance of the sensor coils from each other may be increased to that mutual affection of their respective measurements may be minimised.

In embodiments, the stator part at the sensor countersurface may have first regions of a first electric conductivity and/or magnetic permeability having a first length, and second regions of a second electric conductivity and/or magnetic permeability lower than the first electric conductivity and/or magnetic permeability having a second length. The first regions and second regions may be formed alternatingly in a moving direction of the mover part of the linear motor. An extension of each of the sensing coils may coincide with the smallest one of the first length and the second length. Preferably, the first length may be smaller than or equal to the second length. Further preferably, the second length may be an integer multiple of the first length.

A further aspect of the invention relates to an elevator system comprising at least one elevator car running in an elevator shaft and movable by a linear motor, and a control device for controlling the linear motor. The linear motor comprises a mover part fixed to the elevator car and a stator part fixed to the elevator shaft. The elevator car may comprise an inductive sensing device as described above, and the control device may comprise means being adapted to execute the steps of the method described above. The elevator system including the sensing device and being formed to execute the method described above exhibits at least the same qualities and advantages of the sensing device and method, respectively.

A further aspect of the invention is related to a method for determining a position of a linear motor, comprising the steps:
  supplying an alternating current or alternating voltage to at least one oscillating circuit comprising at least one sensing coil being or assumed to be arranged in a fixed spatial correlation to a mover part of the linear motor such that an opening plane of the sensing coil faces a sensor counter-surface of a stator part of the linear motor with a gap therebetween;
  receiving a response signal from the oscillating circuit;
  determining a position of the linear motor based on the response signal.

The method of this aspect may include any features mentioned in the context of the first aspect as far as applicable, and exhibits at similar qualities and advantages. A similar sensor device as described may be adapted for use with this method. An elevator system may use this method and/or sensing device as well.

SHORT DESCRIPTION OF THE DRAWINGS

The invention will become more apparent by the following description of exemplary embodiments which are also shown in the accompanying drawings. Identical or similar parts or parts with the same function are indicated by the same reference numbers in all figures. All drawings are strictly schematic and not necessarily to scale so that dimensions or relations thereof are not meant to limit the claimed invention unless explicitly mentioned otherwise.

DESCRIPTION OF EXEMPLARY EMBODIMENTS

Figure 1:
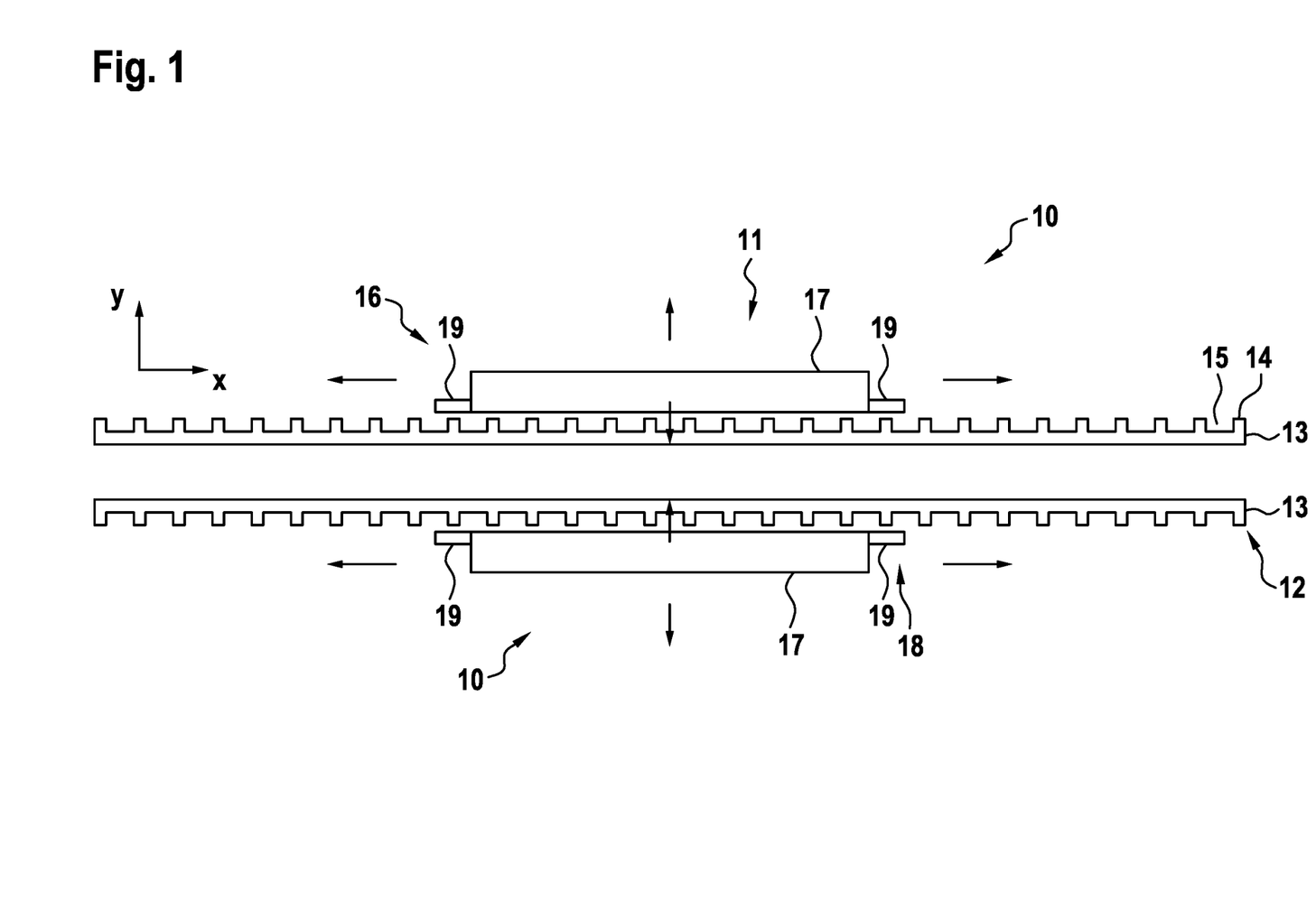
FIG. 1 shows a schematic side view of a linear motor comprising a levitation unit and a sensing device.

FIG. 1 shows a schematic side view of a linear motor 10 comprising a levitation unit and a sensing device of an exemplary embodiment of the present invention. A coordinate system x, y indicates a moving direction x and a levitation direction y which will be explained later. The linear motor 10 comprises a mover part 11 and a stator part 12. The stator part 12 comprises two stator rods 13 having first regions 14 exemplified as teeth or projections and second regions 15 exemplified as slots or indentations, alternating each other in the moving direction x which may also be understood as a longitudinal direction of the linear motor 10. The mover part 11 comprises a levitation unit 16 of two motor units 17. In the present embodiment, each motor unit 17 is exemplified as a flux switching permanent magnet linear motor (FSPMLM) unit function of which will be explained later in the context of FIG. 11. The motor units 17 are controllable or controlled by a control unit (not shown) to cooperate with the stator rods 13 such that the mover part 11 moves along the stator part 12 in the moving direction x (forth: positive x; or back: negative x). More particularly, each motor unit 17 cooperates with first regions 14 and second regions 15 of one stator rod 13 facing it. The motor units 17 are also controllable or controlled by the control unit to levitate the mover part 11 with respect to the stator part 12. Levitation in this context means that length of a gap (34, FIG. 3) formed between each motor unit 17 and respective stator rod 13 is kept within a predetermined range, so that the motor units 17 never touch the respective stator rods 13.

The mover part 11 also carries an inductive sensing device 18 having four sensor units 19. This inductive sensing unit 19 is a single printed circuit board (PCB), which may be attached nearby the motor units as shown in FIG. 1. Either one or several sensor unit(s) 19 may be located on the top and/or bottom ends of the motor unit 17 close to the stator rail 13. The sensor units 19 are designed to detect a distance from the stator part 12, or more particularly, from a surface of the stator rod 13 facing the respective sensor unit 19. In other words, the sensor units 19 work as proximity or near-range distance sensors, and first regions 14 and second regions 15 of the stator part 12 act as a sensor counter-surface (33, FIG. 3) of the sensor unit 19, distance of which sensor counter-surface is to be detected.

Levitation control of each motor unit 17 could either use information from their own sensing unit(s) 19 or they could share the information from a common sensing unit(s) 19. In this exemplary embodiment where several sensor unit(s) 19 are located on the top and/or bottom ends of the motor unit 17, the changing proximity information of the sensor units 19 may also be utilized for determining a position of the mover part 11 with respect to longitudinal direction of the stator part 12, i.e., the moving direction x. Details of proximity and position determination will be explained later.

Figure 10:
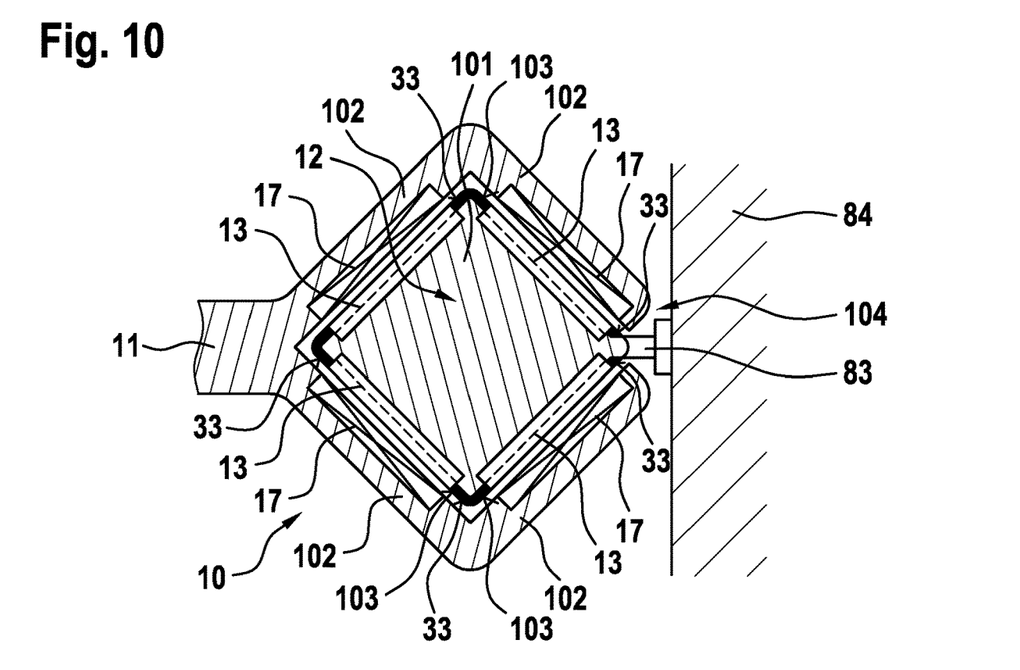
FIG. 10 shows an enlarged cross-section through a stator rod and a mover of the linear motor shown in FIG. 8.

Even if the sensor unit(s) 19 are depicted to be located on the top and/or bottom ends of the respective motor unit 17, in another exemplary embodiment they or some of them alternatively or additionally be located laterally of the motor unit 17, and face a flat surface of the stator part 12 for proximity sensing as will be further explained in the context of FIG. 10.

Even if only one levitation unit 16 of two motor units 17 is depicted, is noted that the mover part 11 may have more than one levitation unit 16, and a levitation unit 16 may have more than on pair of motor units 17, or even an odd number (e.g., three) of motor units 17, depending on the number and spatial arrangement of stator rods 13.

Figure 2:
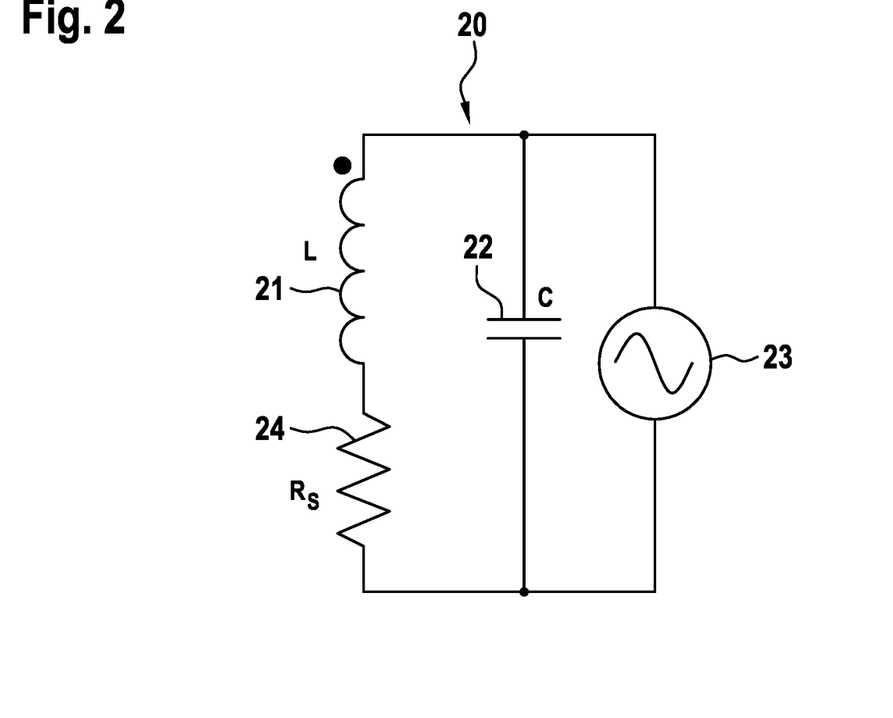
FIG. 2 shows a schematic diagram of an oscillation circuit comprising a sensor coil of a sensing unit shown in FIG. 1.

FIG. 2 shows a schematic diagram of an oscillation circuit 20 included in a sensor unit 19 shown in FIG. 1. The oscillation circuit 20 comprises a sensor coil (L) 21 and a capacitor (C) 22 connected in parallel, and an oscillator 23 supplying a controlled alternating current or alternating voltage. An energy loss of the oscillation circuit 20, in particular by Eddy currents induced in an object to be sensed, is indicated by a resistance ($R_S$) 24. The parts of the oscillation circuit 20 may be located on a PCB mentioned above. The sensor coil 21 may be a planar coil which may be directly printed on the PCB. Furthermore, the sensor coil 21 may be embodied as an air coil. For sensing a distance, the sensor coil 21 magnetically couples to the object being sensed, i.e., the sensor counter-surface formed by the first regions 14 and second regions 15 of the stator part 12 (FIG. 1). The oscillator 23 may be an induction-to-digital converter. One PCB may comprise a plurality of LC oscillation circuits 20 where the respective sensor coils 21 may be arranged as a matrix or other formation, examples of which will be explained later in the context of FIGS. 4A, 4B, 5 and 6.

Figure 3:
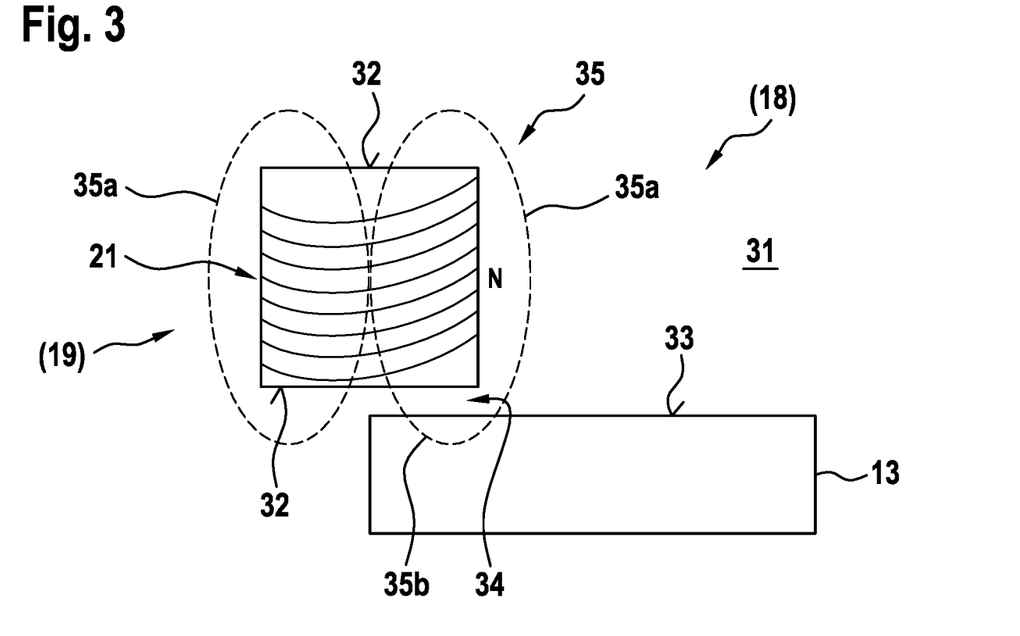
FIG. 3 shows a principle drawing of a sensing unit comprising the sensor coil of FIG. 2.

First, a sensing principle using the oscillation circuit 20 of FIG. 2 will be explained with reference to FIG. 3. FIG. 3 shows a principle drawing of a part of sensing unit 18 comprising the sensor coil 21 of FIG. 2. Other elements of the oscillation circuit are omitted for clarity and conciseness.

As shown in FIG. 3, the sensor coil 21 is situated vis-à-vis stator rod 13 within an environment 31. The environment 31 may generally be air but may also be any other medium like vacuum, other gases, or liquids according to applications.

The sensor coil 21 may be an air core coil having several windings, and opening surfaces 32. One opening surface 32 of the sensor coil 32 faces a sensor counter-surface 33 formed by an object to be sensed which in this example is the stator rail 13, with a gap 34 formed between the one opening surface 32 and the sensor counter-surface 33. As soon as current flows through the windings of the sensor coil 21, a magnetic field 35 is generated, some magnetic paths of which are depicted in FIG. 3. The magnetic paths may have a first section 35a running through the environment (air) 31, and a second section 35b running through material of the object to be sense (stator rail 13). In a practical example, the nominal air gap may be 1.25 mm but this is open to design.

The proximity from the stator rail 13 may be measured either by measuring resistive losses in the oscillation circuit 20 (FIG. 2) or by determining frequency deviation of the oscillation circuit 20 compared to a stable reference frequency.

In a first case (method 1), the oscillating circuit 20 generates the alternating magnetic field 35 around the sensor coil 21 and if an electrically conductive object such as stator rail 13 gets into its influence Eddy currents are induced to the object. These Eddy currents generate losses, which means that the converter 23 (FIG. 2) must supply more current to maintain the oscillation. The converter regulates the oscillation amplitude in a closed-loop configuration at a constant level, while monitoring the dissipated energy. According to dissipated energy, the resistive deviation (change in $R_S$ value of resistance 24) and furthermore a distance (gap length of gap 34) to the object can be determined. It will be noted that with exact information on the material and the structure of the object the gap length can be determined more accurately.

In a second case (method 2), if magnetically conductive object such as stator rail 13 gets into influence of the alternating magnetic field 35 around the sensor coil 21 the oscillation frequency changes as the inductance of the magnetic circuit (oscillation circuit+magnetically conductive object) changes according to following equation:

$$f = \frac{1}{2\pi\sqrt{LC}}$$

The oscillation frequency is compared to a stable reference frequency (a clock frequency provided by a crystal oscillator which may be included in oscillator 23), and according to the variation the gap length can be determined. Again, with exact information on the material and the structure of the object the gap length can be determined more accurately.

The gap length can be determined by either with the method 1, method 2 or with a combination of simultaneous measurements with method 1 and 2.

In a third case (method 3), an alternating voltage (with constant amplitude) is supplied to the resonant oscillating circuit 20, and an amplitude of the oscillating circuit's 20 alternating current is measured, generated responsive to the alternating voltage. Then a frequency of the alternating voltage is changed gradually such that amplitude of the oscillating circuit 20 current changes towards a preset reference value. When the amplitude of the oscillating circuit's 20 responsive alternating current corresponds to the reference value (e.g. is regulated to the reference value), frequency of the alternating voltage that causes this current is measured (read) and is compared to a preset reference frequency value. A difference between the read frequency and the reference frequency then gives an inductance of the oscillation circuit 20, because the read frequency changes when the inductance changes. The reference frequency comes from a high-accuracy clock oscillator, such as crystal oscillator, and it is inputted to the inductive sensing device 18.

Next, exemplary embodiments of coil arrangement or coil matrix layout in the sensor units 19 are described. FIGS. 4A, 4B, 5 and 6 show respective schematic perspective views of exemplary sensor units 19 included in an inductive sensing device 18 of the present invention. As shown in FIGS. 4A, 4B, 5 and 6, a plurality of sensor coils 21 (six sensor coils 21 in examples shown in FIGS. 4A, 4B, four sensor coils 21 in an example shown in FIGS. 5 and 6) are arranged on one printed circuit board (PCB) 41. The sensor coils 21, may be counted 21-1, 21-2, . . . , 21-*n* for n sensor coils 21 included in one sensor unit 19, i.e., placed or formed on one PCB 41.

Figure 4A:
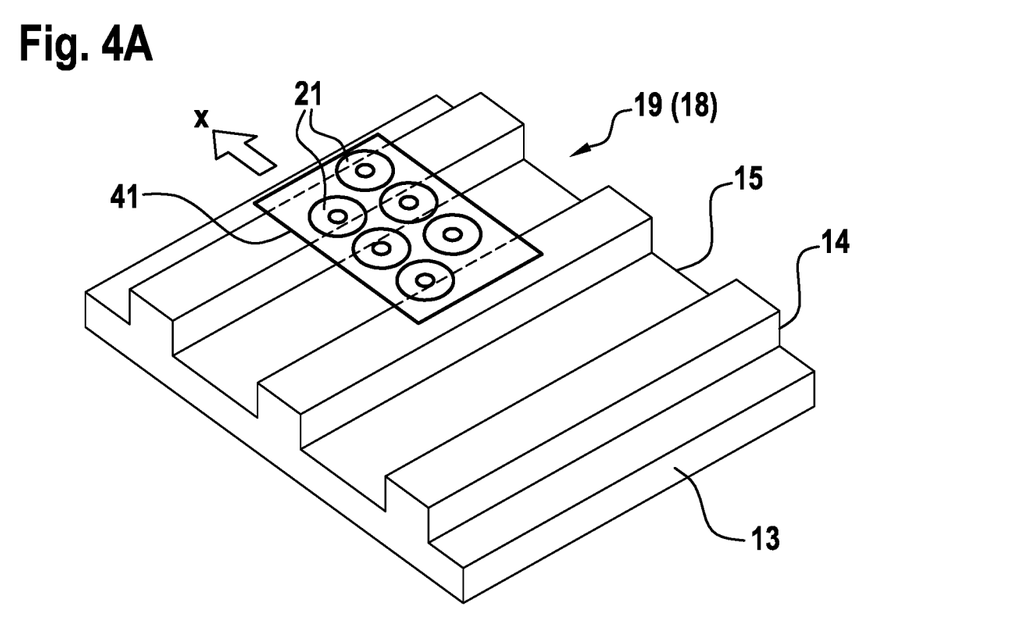
FIG. 4A shows a schematic perspective view of an exemplary sensing unit.
Figure 4B:
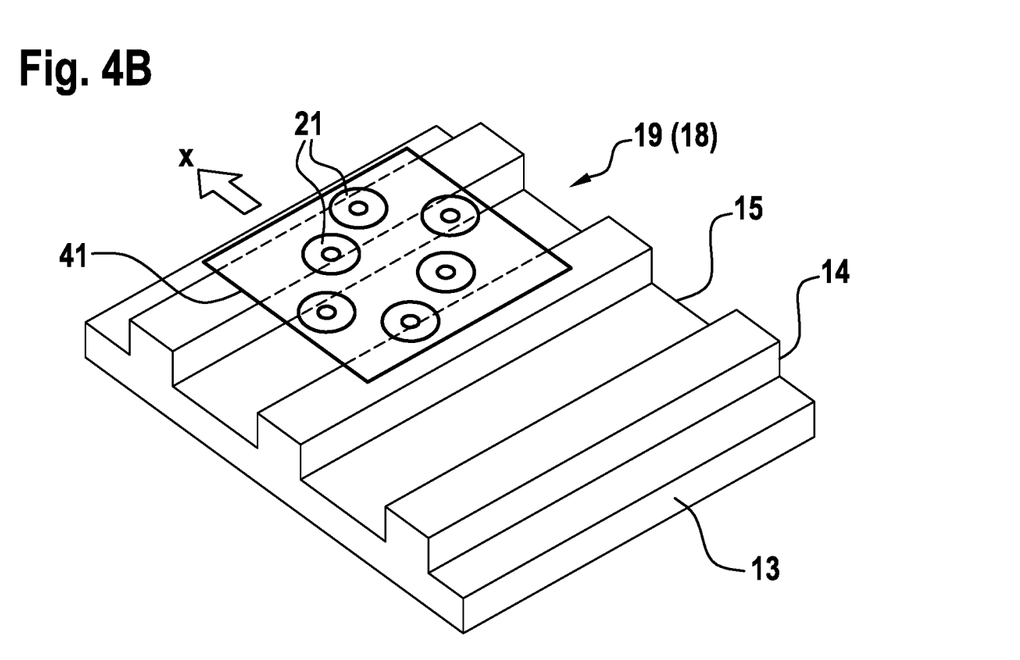
FIG. 4B shows a schematic perspective view of another exemplary sensing unit.

In the exemplary embodiment shown in FIG. 4A the tooth pitch which is defined as the length of a tooth (first region 14) plus a length of a slot (second region 15) between two successive teeth may be 3 cm with the ratio of 1:2, i.e., the first regions 14 have a length of 1 cm while the second regions have a length of 2 cm. Therefore, six coils are placed with 0.5 cm dislocation between each other. In the exemplary embodiment shown in FIG. 4A, coils are placed next to each other, but to reduce electromagnetic interference, in the exemplary embodiment shown in FIG. 4B, the coils are displaced further apart still maintaining the 0.5 cm dislocation in the tooth pitch direction (longitudinal direction or moving direction x). It will be understood that all numerical values are strictly by way of example and may be varied according to requirements.

Figure 5:
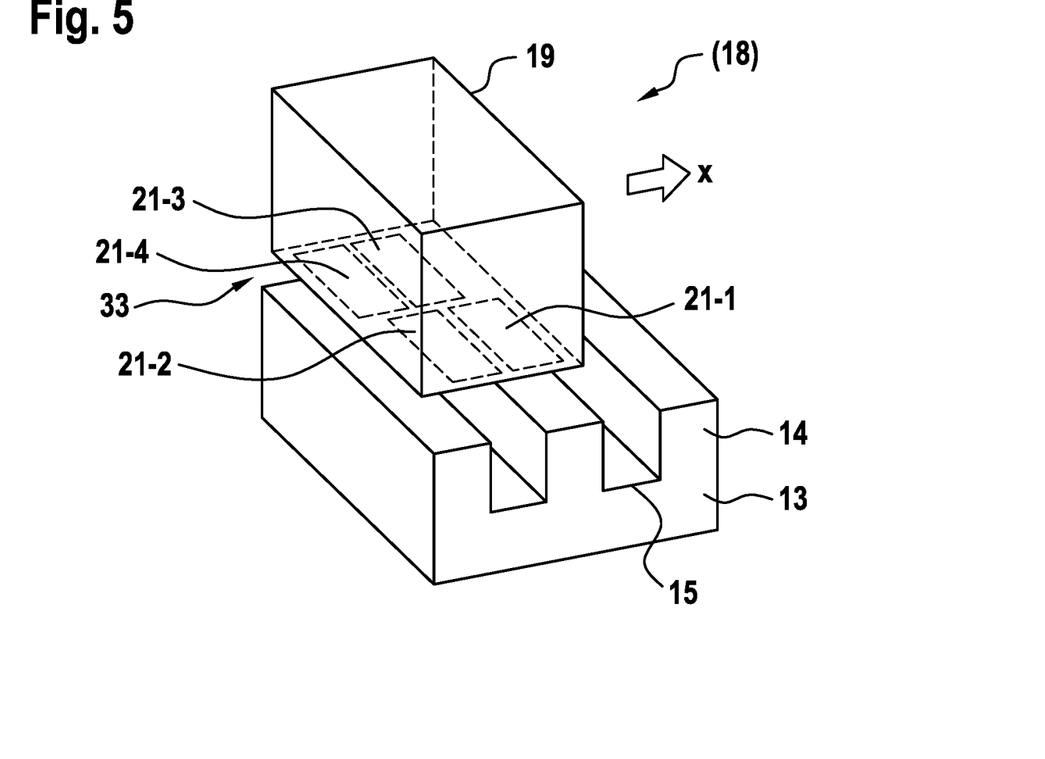
FIG. 5 shows a schematic perspective view of another exemplary sensing unit.
Figure 6:
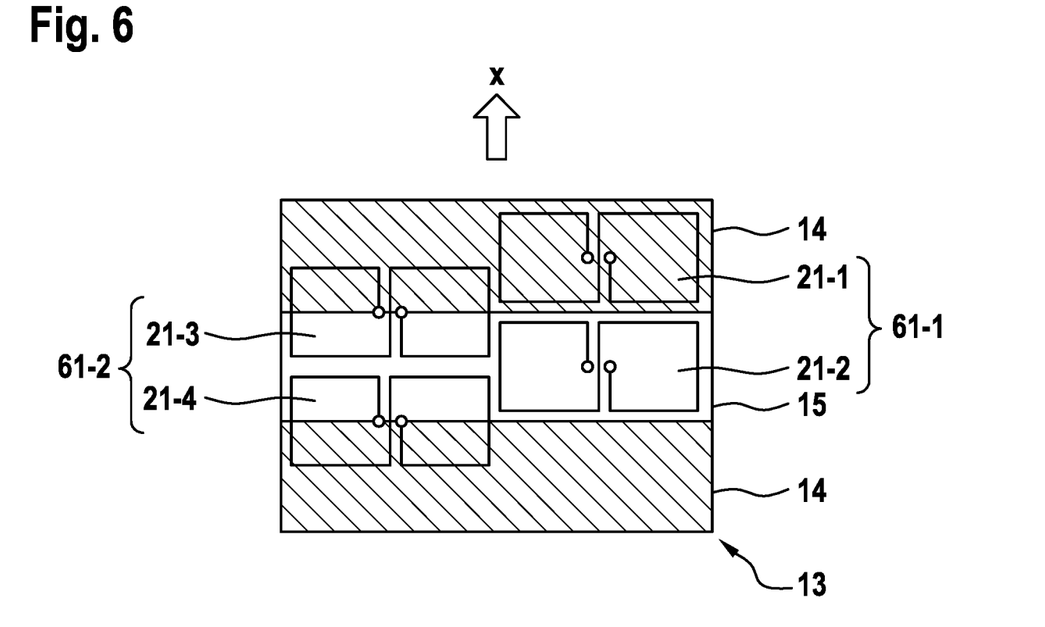
FIG. 6 shows a schematic plan view of the sensing unit of FIG. 5.

The invention is not limited to this tooth pitch and ratio, shape and the number of the sensor coils 21. As shown in FIG. 5 as another exemplary embodiment, four sensor coils 21 can be provided to detect position and air gap. As shown in FIG. 6, sensor coils 21 may be grouped in two coil groups 61 where each coil group 61 includes sensor coils 21 succeeding each other in the moving direction x, while the sensor coils 21 of a first coil group 61-1 overlap with the sensor coils 21 of a second coil group 61-2 in the moving direction x.

The diameter of each sensor coil 21 may be set to be equal to the length of the first region 14 (tooth tip). The shape is not fixed and may for example be circular, square, hexagonal and octagonal or other. The tooth pitch determines the number of the sensor coils 21 in the matrix. For example, the number of sensor coils 21 is derived by keeping the diameter of each sensor coil 21 equal to the length of the first region 14 and by adding a needed amount of sensor coils 21 with half the length of the first region 14 dislocation to each other until it is not possible to reach a situation where there would not be three sensor coils 21 above a single first region 14 simultaneously when the PCB 41 is moved along the stator rail 13 from one end to the other.

Figure 7A:
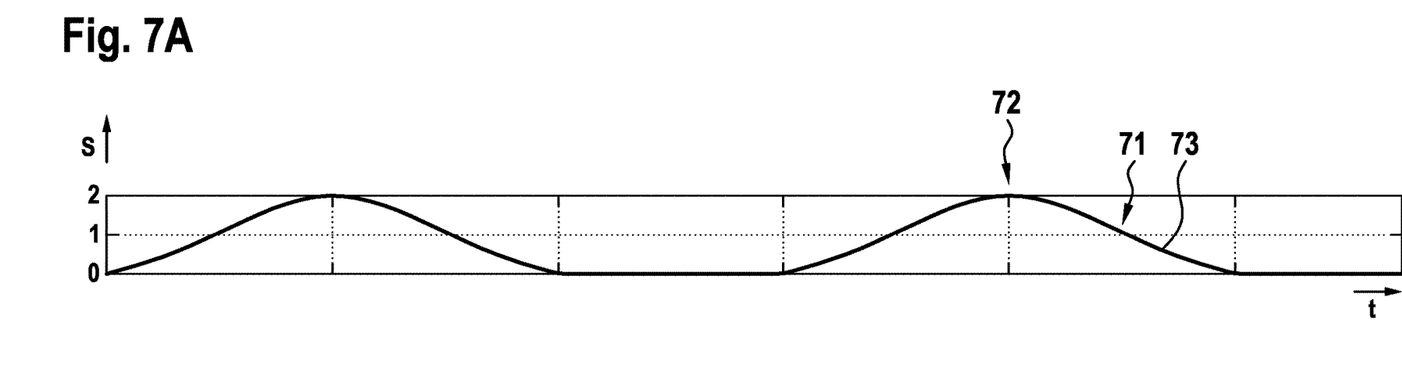
FIG. 7A shows a schematic diagram exemplifying a sensor response signal.
Figure 7B:
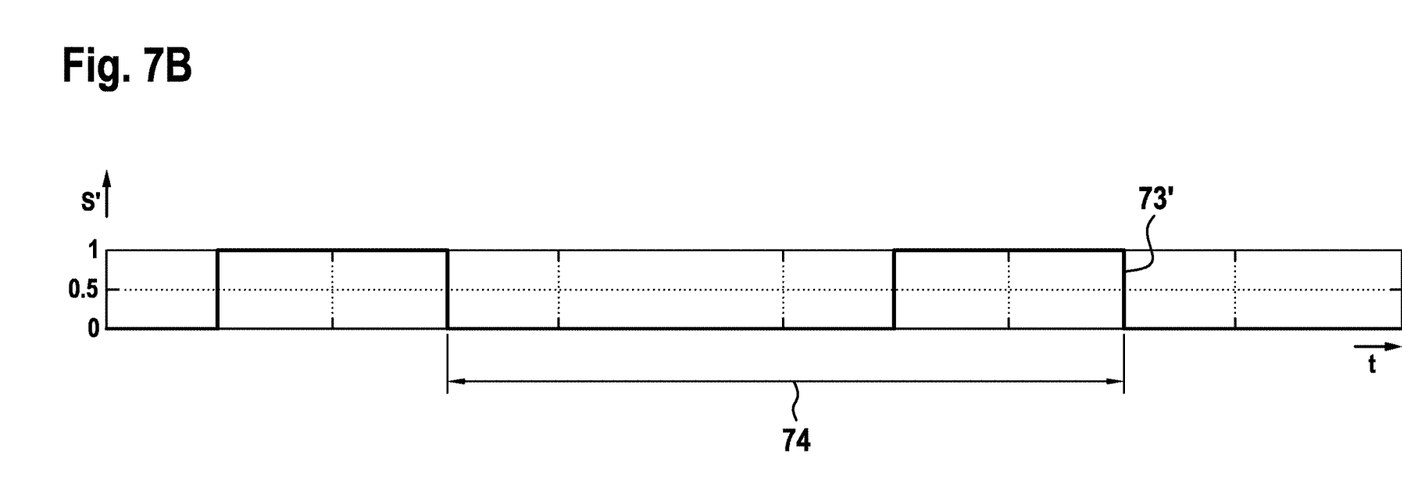
FIG. 7B shows a schematic diagram exemplifying a digitalized sensor response signal of FIG. 7A.

Next, a principle of position determination using the sensing device 18 is explained with reference to FIGS. 7A and 7B. FIG. 7A shows a schematic diagram exemplifying a sensor response signal S, and FIG. 7B shows a schematic diagram exemplifying a normalized or digitalized sensor response signal S'.

The sensor response signal S may for example be a change in a cumulative resistance $R_S$ of the oscillation circuit (method 1 described above), a change of a responsive oscillation frequency or frequency deviation of the oscillation circuit 20 (method 2 described above), a change of exciting frequency of the oscillator 23 for maintaining a response current amplitude of the oscillation circuit 20 (method 3 described above), or any other property of the oscillation circuit 20 or a control circuit thereof that may be responsive to a distance change of the sensing device 18 from an object to be sensed.

The normalized or digitalized sensor response signal S' is normalized such that it may only assume values of zero or one, i.e., false or true, and will be defined to be zero (false) if the sensor response signal S is lower than half its maximum amplitude, and one (true) if equal or higher than said maximum amplitude. The maximum amplitude is characteristic for the change of the sensor response signal when passing a first region 14 (tooth of stator rail 13), and may be determined beforehand. The normalized or digitalized sensor response signal S' may be assumed to be an output signal of a converter (inductance-to-digital converter) which may also include the oscillator 23 of the oscillation circuit 20 (FIG. 2). The oscillator may be a crystal oscillator providing a stable reference frequency or clock frequency.

It will be noted that changes of the sensor response signal S generated by imbalance of levitation can be generally assumed to be considerably smaller than changes generated by passing a stator tooth. Hence, a waveform generated by levitation imbalance (levitation waveform) may be distinguished from a waveform generated by passing stator teeth (linear movement waveform). A resulting waveform 71 of the sensor response signal S may be assumed to be a superposition of levitation and linear movement waveforms, and the resulting waveform 71 may be analysed to separate a levitation part and a linear movement part from each other.

When the coil passes a first region (stator tooth) 14, the sensor response signal (proximity indication signal) S will change according to the waveform shown in FIG. 7A. When one sensor coil 21 is directly above a first region 14, it will provide a maximum signal value 72 and both sensor coils 21 next to it (with 0.5 cm dislocation) will be equal to each other but with smaller value than the sensor coil 21 in the middle. If the coil matrix is moved a bit to either direction, the sensor response value of the center sensor coil 21 will decrease and the values provided by adjacent sensor coils 21 will not be equal to each other anymore.

One converter 23 will output a higher signal value than the other, depending on which adjacent sensor coil 21 is closer to the center of the passed first region 14. By either calculating or learning with an initial "signal determination run" in a surrounding structure like, e.g., an elevator shaft, these signal patterns for each sensor coil 21 and their relations to each other can be saved to a controller, which will determine the absolute position of the mover part 11 of the linear motor 10.

As mentioned above, this comparison may be done to previously mentioned converter signals which would be normalized according to $$X = \frac{X - X_{min}}{X_{max} - X_{min}}$$

or other normalization equation/algorithm. This could reduce the error in position determination caused by the air gap length variation.

When the absolute position is known the closest sensor coil 21 to the tooth can be determined and its deviation to the center of the tooth. Furthermore, the gap 34 can be determined by comparing the absolute signal value to the memory of the controller, and the air gap length can be determined.

As a practical example, this invention may be executed using Texas Instruments LDC1101 digital-to-inductance converter as oscillator 23 which according to its datasheet contents of which is included herein by way of reference, can provide up to 183 900 measurements/second. Also, the delay between each measurement calculated according to the datasheet could be as low as 9.4 µs.

$$\frac{\text{post conversion processing}}{f_{ref}} + SPI \text{ communication} =$$
$$\frac{55 \text{ cycles}}{16 \text{ MHz}} + \frac{6 \cdot 8 \text{ cycles}}{8 \text{ MHz}} \approx 9.4 \text{ µs}$$

As can be seen in FIG. 7A, a wave front 73 of the sensor response signal S coming from the oscillation circuit 20 may be relatively flat. Depending on a velocity of the mover part, the wave front 73 may be steeper or flatter. Anyway, the normalized or digitalized sensor response signal S' by definition has a very steep wave front 73' just like a rectangular waveform so that an event of passing a stator tooth may be detected very precisely. A time interval 74 between two successive wave fronts 73' may therefore be used, together with information on tooth pitch, to easily determine a velocity of the mover part of the linear motor 10. By further analysis, an acceleration may be calculated therefrom.

As described above, the sensor units 19 may be located on the area of stator rod 13 of the linear motor 10 having first regions (teeth) 14 and second regions (slots) 15. This configuration is especially useful if the same sensing device is used for measuring a position of the mover part 11 in the moving direction x of the linear motor 10. In another exemplary embodiment, it is provided that the sensor units 19 use a smooth sensor counter-surface 33 is smooth instead of toothed sensor counter-surface 33. Such configuration may help to get good accuracy for air gap measurement, for levitation control. In this exemplary embodiment, a smooth surface of material having good electric and/or magnetic properties may be arranged to the stator guide, and one or more of the sensor units 19 may be located vis-a-vis that smooth surface. This principle will be referred to again in the description of FIG. 10.

An exemplary embodiment of an elevator system 80 is described in the following with reference to FIGS. 8 to 11.

Figure 8:
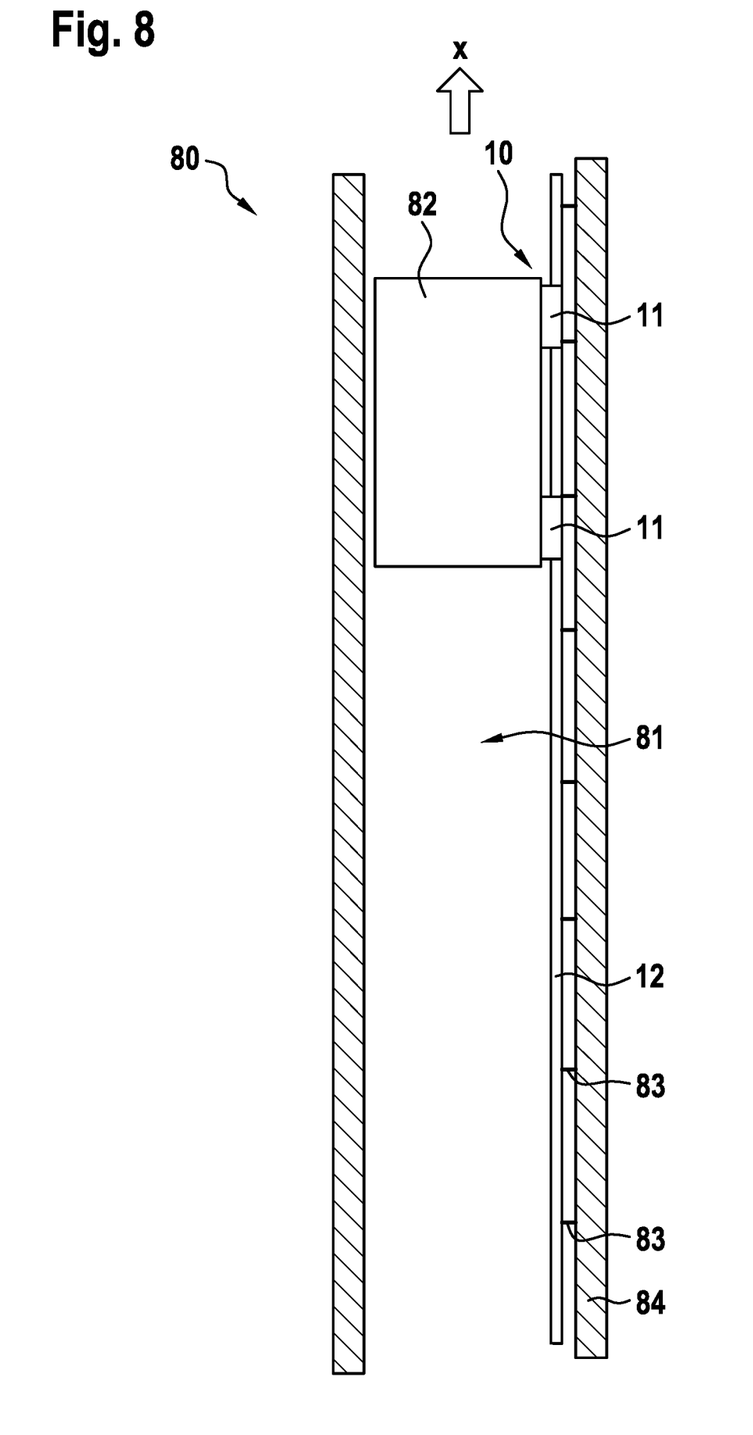
FIG. 8 shows a schematic side view of an elevator system comprising a linear motor.
Figure 9:
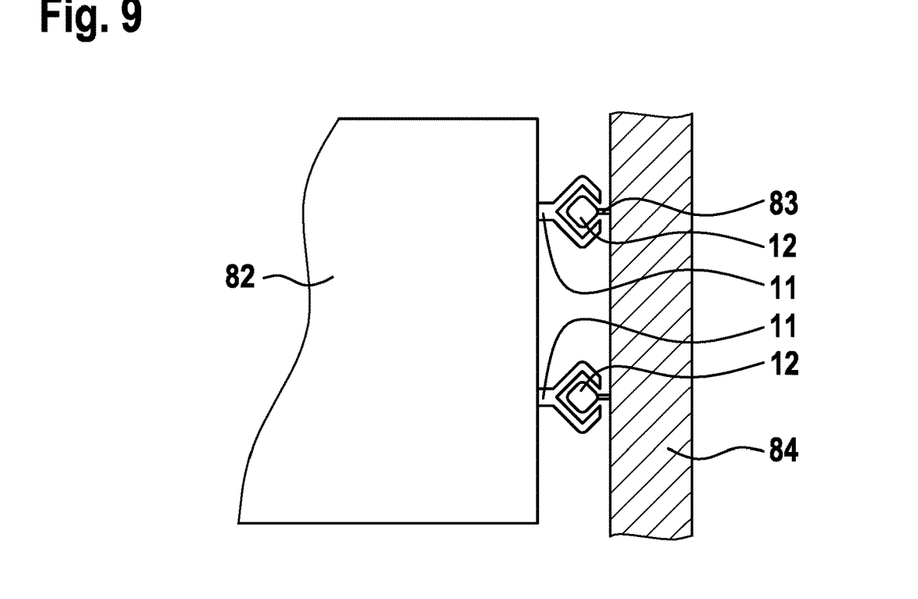
FIG. 9 shows a schematic horizontal cross-sectional view of parts of the elevator system of FIG. 8.

FIG. 8 shows a cross-sectional side view of an elevator system 80, and FIG. 9 shows a partial transversal cross-section thereof. As seen in FIG. 8, the elevator system 80 comprises an elevator shaft 81 wherein an elevator car is allowed to move up and down along a moving direction x. The elevator system 80 has a linear motor 10. The linear motor 10 comprises a stator part 12 embodied by two parallel stator beams which are mounted with fastening elements 83 to a shaft wall 84 of the elevator shaft 81. The linear motor 10 further comprises four mover parts 11 which are fixed with the elevator car 82 and arranged to cooperate with the stator parts 12. More particularly, two sets of mover parts 11 are provided, each set consisting of two mover parts 11 located one above the other on each stator part 12. More particularly, the lower mover part 11 in each set is located in the lower half of the elevator car 82 whereas the upper mover part 11 is located in the upper half of the elevator car 82 so as to provide a rucksack-type support of the elevator car 82 at the stator parts 12. It is noted that the stator parts 12 and mover parts 11 of the elevator system 80 of FIG. 8 also form an electromagnetic guide for the elevator car 82 and are controlled to levitate in accordance with the present invention so that any guide rollers and guide rails or other guiding means can be omitted. However, car guides co-acting with optional guide rails running vertically along the shaft wall 84 may be provided as an additional security option (not shown).

The vertical stator parts 12 as well as the mover parts 11 of the elevator car 82 are shown in more detail in FIG. 10 which is a more detailed view of a mover part 11 and a stator part 12 in FIG. 9. According to FIG. 10, the vertical stator part 12 comprises a support structure 101 with a generally square cross-section. The support structure may be of metal such as steel, aluminium, or a compound fibre material such as glass fibre or carbon fibre. On each side, the support structure 101 carries a metal stator rod 13. Each stator rod 13 is formed as shown in FIG. 1 having first regions 14 formed as teeth and second regions 15 formed as slots between two consecutive teeth (the slot grounds are indicated by dashed lines within the stator rods 13). The mover part 11 comprises a C-type profile which surrounds the stator part 12 but leaves an opening 104 for allowing the C-type profile to pass the fastening elements 83, as the mover part 11 travels along the shaft 81. The C-type profile of the mover part 11 has four arms 102 each being aligned with and facing one of the sides of the support structure 101. Each arm 102 carries a motor unit 17 formed and arranged to co-act with the stator rods 13 of the stator part 12.

As can be seen in FIG. 10, the stator rods 13 leave smooth lateral surfaces 103 on the sides of the support structure 101 which may be used as sensor counter-surfaces 33. It will be noted that the lateral surfaces 103 of two adjacent sides of the support structure 101 meet each other in a corner but however the corners need not to be used as sensor counter-surfaces 33. If the support structure 101 is of non-conductive and/or non-magnetisable material, the lateral surfaces 103 may be provided with a foil or coating or lining providing the required electric and/or magnetic properties for inductive sensing of the gap length as described above. It will be noted that it is possible to use the smooth sensor counter-surfaces 33 provided at the lateral surfaces 103 in addition to a toothed sensor counter-surface formed by the sensor rods 13, as described above. For inductive gap length sensing, smooth sensor counter-surfaces 33 provided at the lateral surfaces 103 are sufficient, but for position sensing using the same inductive sensor, a sensor counter-surfaces 33 as provided by the sensor rods 13 having alternating electrical and/or magnetic properties are needed. As needed, sensing devices 19 (FIG. 1) may be provide before and/or behind and/or laterally of each motor unit 17 with respect to the moving direction x.

Figure 11:
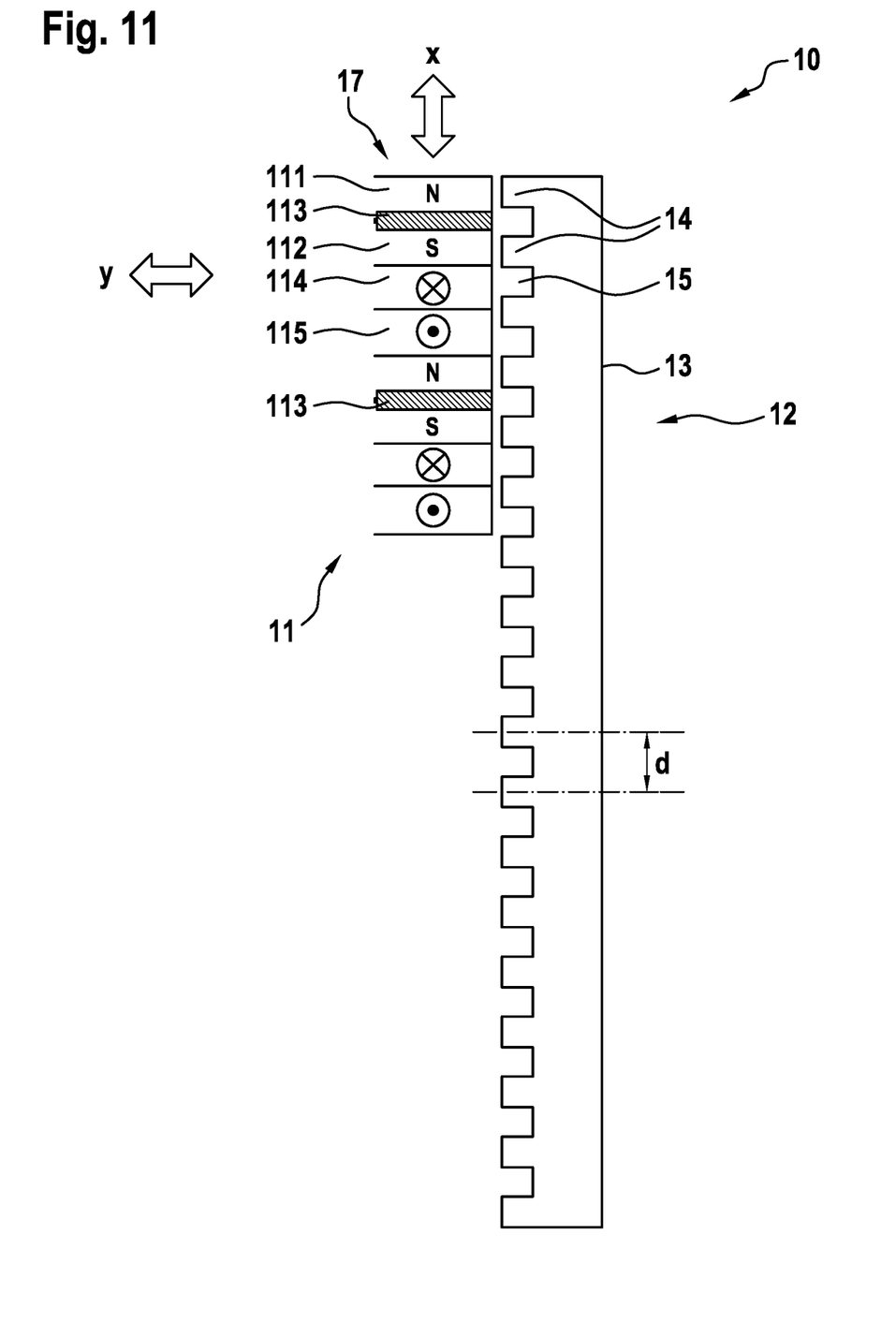
FIG. 11 shows a schematic longitudinal cross-sectional view of a switching permanent magnet motor (FSPM) used as a linear motor.

FIG. 11 shows the operation principle of the flux switching permanent magnet motor formed by each motor unit 17 and the stator rods 13 in the stator part 12. The stator rod 13 comprises first regions 14 embodied as teeth projecting from the stator rod 13 which teeth are spaced apart by slots or second regions 15. The tooth pitch d is identical throughout the length of the stator rod 13. The stator in the stator part 12 in a longer vertical shaft 81 can be comprised of one single stator rod 13 with a corresponding length or by several stator rods 13 located one above each other, according to the required shaft length. In the connecting areas of stator rods 13 located above each other the pitch d has to be maintained. Each motor unit 17 comprises a succession of two mover irons 111, 112 between which one thin magnet 113 is located. This package of mover irons 111, 112 and magnet 113 is followed by two windings 114, 115 which are controlled as to produce a magnetic field with opposite direction. This succession 111, 113, 112, 114, 115 of mover irons, permanent magnets and windings is repeated according to the length of the mover. The movement of the motor unit 17 with respect to the stator rod 13 is accomplished by controlling the both windings 114, 115 to switch the flux direction to the opposite so that with each switching, the mover 11 moves half of the pitch d of the first regions 14 of the stator rod 13. Thus, the mover part 11 can be controlled to move upwards or downwards along the moving direction x with respect to the stator rod 13.

The invention has been described above by reference to exemplary embodiments thereof. It will be noted that the invention is not limited by the exemplary embodiments or their features but is defined by the appended claims in their broadest understanding. Features of aspects and embodiments may be used in other aspects and embodiments of the present invention as well as features of exemplary embodiments may be used in other exemplary embodiments, as applicable. Thus, features of the various embodiments of the invention can be applied within the framework of the invention in conjunction with other embodiments.

By the inventive methods, devices and systems, at least the following advantages may be achieved:

- One same sensing device may provide information about air gap length and mover position from the stator rail without extra modifications.
- Measurements are very fast (up to 183 900 samples/second depending on the converter used).
- The control has short delays.
- The end product (sensor) is highly affordable.
- The sensor fits in a small space.
- The inductive sensing may be used in elevator systems but may also be utilized in other products and/or products which require fast and precise measurements in short measuring distances.

LIST OF REFERENCE SIGNS 10 linear motor
11 mover part
12 stator part
13 stator rod
14 first region (e.g., tooth)
15 second region (e.g., slot)
16 levitation unit (2, 3, or 4 motor units 17)
17 motor unit (e.g. flux switching permanent magnet linear motor unit)
18 inductive sensing device
19 sensor unit
20 oscillation circuit
21 sensor coil
22 capacitor
23 oscillator
24 resistance (losses)
31 environment (e.g., air)
32 opening plane of sensing coil 21
33 sensor counter-surface
34 gap
35 magnetic field of sensor coil 21
35a magnetic path in environment
35b magnetic path in material
41 printed circuit board
61 coil group
71 waveform
72 maximum
73 wave front
73' normalised wave front
74 interval
80 elevator system
81 elevator shaft
82 elevator car
83 fastening element
84 shaft wall
101 support structure
102 arm
103 lateral surface
111 first mover iron
112 second mover iron
113 permanent magnet
114 first winding
115 second winding
d pitch
S response signal
S' normalized/digitalized signal
t time
x moving direction
y levitation direction

The invention claimed is:

1. A method for levitation control of a linear motor, comprising the steps of:
supplying an alternating current or alternating voltage to at least one oscillating circuit comprising at least one sensing coil arranged in a fixed spatial correlation to a mover part of the linear motor such that an opening plane of the sensing coil faces a sensor counter-surface of a stator part of the linear motor with a gap therebetween;
receiving a response signal from the oscillating circuit;
determining a gap length of the gap based on the response signal; and
controlling the gap length by driving a magnetic levitation unit of the linear motor based on the determined gap length.

2. The method of claim 1, wherein the supply of alternating current or alternating voltage is controlled to maintain an oscillation amplitude of the oscillation circuit at a constant level while monitoring the energy consumption, and the gap length is determined based on a variation of the monitored energy consumption, wherein the response signal corresponds to the monitored energy consumption.

3. The method of claim 1, wherein the alternating current or alternating voltage is generated with a stable reference frequency while monitoring the oscillation frequency of the oscillation circuit, and the gap length is determined based on a deviation of the monitored oscillation frequency from the reference frequency, wherein the response signal corresponds to the monitored oscillation frequency.

4. The method of claim 1, wherein the alternating voltage is supplied with a constant amplitude while monitoring an amplitude of a responsive alternating current generated in the oscillation circuit in response to the supplied alternating voltage; then a frequency of the alternating voltage is changed gradually such that the amplitude of the responsive alternating current changes towards a preset reference current value until the amplitude of the responsive alternating current corresponds to the reference current value; then a frequency of the alternating voltage that causes this current is detected and is compared to a preset reference frequency value; and the gap length is determined based on a difference of the detected frequency from the reference frequency value, wherein the response signal corresponds to the frequency of the alternating voltage.

5. The method of claim 1, wherein the method is executed using an inductance-to-digital converter having a conversion rate of 5 ksps or more.

6. The method of claim 1, wherein the response signal is used for determining a position and/or velocity and/or acceleration of the mover part with respect to the stator part in a moving direction of the mover part, based on the stator part where the sensor counter-surface is formed having alternating electric conductivity and/or magnetic permeability properties in a moving direction of the mover part.

7. The method of claim 6, wherein an amplitude or change of amplitude over time of the response signal is analysed for determining the position of the mover part.

8. The method of claim 5, wherein response signals of a plurality of oscillation circuits are received simultaneously for determining the position of the mover part.

9. The method of claim 8, wherein a common change of the response signals of the plurality of oscillation circuits is correlated with a change of the gap length, and a subsequent change of the response signals of the plurality of oscillation circuits is correlated with a change of position of the mover part.

10. The method of claim 9, wherein an interval of wave fronts of the response signals of the plurality of oscillation circuits is used for determining a velocity of the mover part.

11. An inductive sensing device for use in the method for levitation control of a linear motor of claim 1, the inductive sensing device comprising at least one sensing coil of an oscillating circuit, said sensing coil being arranged in a fixed spatial correlation to a mover part of the linear motor such that an opening plane of the sensing coil faces a sensor counter-surface of a stator part of the linear motor with a gap therebetween.

12. The inductive sensing device of claim 11, further comprising at least one sensing unit comprising a plurality of oscillating circuits each comprising at least one sensing coil, the sensing coils being arranged such that at least two of the sensing coils succeed each other in the moving direction of the mover part, and/or at least two of the sensing coils overlap each other in the moving direction.

13. The inductive sensing device of claim 12, wherein two of the sensing coils succeeding each other in the moving direction are displaced from each other crossways of the moving direction.

14. The inductive sensing device of claim 12, wherein the stator part at the sensor counter-surface has first regions of a first electric conductivity and/or magnetic permeability having a first length, and second regions of a second electric conductivity and/or magnetic permeability lower than the first electric conductivity and/or magnetic permeability having a second length, the first regions and second regions formed alternatingly in a moving direction of the mover part of the linear motor, and an extension of each of the sensing coils coinciding with the smallest one of the first length and the second.

15. An elevator system comprising:
at least one elevator car running in an elevator shaft and movable by a linear motor; and
a control device for controlling the linear motor,
wherein the linear motor comprises a mover part fixed to the elevator car and a stator part fixed to the elevator shaft,
wherein the elevator car comprises an inductive sensing device comprising at least one sensing coil of an oscillating circuit, said sensing coil being arranged in a fixed spatial correlation to a mover part of the linear motor such that an opening plane of the sensing coil faces a sensor counter-surface of a stator part of the linear motor with a gap therebetween, and
wherein the control device is adapted to execute the steps of the method of claim 1.

16. A method for determining a position of a linear motor, comprising the steps:
supplying an alternating current or alternating voltage to at least one oscillating circuit comprising at least one sensing coil arranged in a fixed spatial correlation to a mover part of the linear motor such that an opening plane of the sensing coil faces a sensor counter-surface of a stator part of the linear motor with a gap therebetween, and an oscillator parallel to the at least one sensor coil;
receiving a response signal from the oscillating circuit; and
determining a position of the linear motor based on the response signal.

17. The method of claim 16, wherein the oscillator is an inductance-to-digital converter having a conversion rate of 1000 ksps OF more.

18. The method of claim 1, wherein the method is executed using an inductance-to-digital converter having a conversion rate of 100,000 ksps or more.

19. The inductive sensing device of claim 14, wherein the first length is smaller than or equal to the second length.

20. The inductive sensing device of claim 19, wherein the second length is an integer multiple of the first length.

* * * * *